(12) United States Patent
Cao

(10) Patent No.: US 7,930,063 B2
(45) Date of Patent: Apr. 19, 2011

(54) DUAL-TYPE PRODUCT REWORKING SYSTEM AND CONTROL METHOD THEREOF

(75) Inventor: Ke Cao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 400 days.

(21) Appl. No.: 12/099,170

(22) Filed: Apr. 8, 2008

(65) Prior Publication Data

US 2009/0211876 A1 Aug. 27, 2009

(30) Foreign Application Priority Data

Feb. 21, 2008 (CN) .......................... 2008 1 0300375

(51) Int. Cl.
*G06F 7/00* (2006.01)
(52) U.S. Cl. ..................... 700/230; 198/349.4
(58) Field of Classification Search .................. 700/230, 700/228, 224; 198/349.4, 349, 890, 370.06
See application file for complete search history.

(56) References Cited

U.S. PATENT DOCUMENTS

| | | | | |
|---|---|---|---|---|
| 5,161,930 A | * | 11/1992 | Canziani | 198/370.06 |
| 5,812,693 A | * | 9/1998 | Burt et al. | 382/149 |
| 6,005,221 A | * | 12/1999 | Cusick, III | 219/137.62 |
| 6,209,703 B1 | * | 4/2001 | Soldavini | 198/370.06 |
| 6,264,042 B1 | * | 7/2001 | Cossey et al. | 209/559 |
| 2002/0045969 A1 | * | 4/2002 | Dierauer | 700/223 |
| 2009/0065330 A1 | * | 3/2009 | Lupton et al. | 198/357 |

* cited by examiner

*Primary Examiner* — Gene Crawford
*Assistant Examiner* — Ramya Prakasam
(74) *Attorney, Agent, or Firm* — Frank R. Niranjan

(57) ABSTRACT

A reworking system includes a reworking machine configured for reworking products belonging to a first type and a second type, a main conveyer belt configured to transport the products to be reworked, first and second branch conveyer belts connected to the main conveyer belt and configured to transport the first and second types of the products to be reworked, a primary scanner installed on the main conveyer belt and configured to scan bar codes of the products to be reworked, and a computer configured to receive and process scanned data from the primary scanner, and actuate the main conveyer belt, the first branch conveyer belt, and the second branch conveyer belt.

3 Claims, 3 Drawing Sheets

DUAL-TYPE PRODUCT REWORKING SYSTEM AND CONTROL METHOD THEREOF

BACKGROUND

1. Field of the Invention

The present invention relates to a product reworking system and control method thereof.

2. Description of Related Art

In electronic product manufacturing, when electronic products cannot pass the quality testing process, it is necessary to rework them. Nowadays, the same kind of electronic products may be classified according to whether or not they are of type RoHS (the restriction of use of certain hazardous substances in electrical and electronic equipment). In order to rework the two types of electronic products, it is necessary to use two reworking machines. However, using two reworking machines can increase costs and reduce the efficiency rate of each machine.

What is needed, therefore, is a reworking system and control method thereof that can process two types of electronic products with only one reworking machine.

SUMMARY

An embodiment of a reworking system includes a reworking machine configured for reworking products belonging to a first type and a second type, a main conveyer belt configured to process the products to be reworked, first and second branch conveyer belts that are connected to the main conveyer belt and configured to transport the first and second types of products to be reworked, a primary scanner installed on the main conveyer belt and configured to scan bar codes of the products to be reworked, and a computer configured to receive and process scanned data from the primary scanner and actuate the main conveyer belt, the first branch conveyer belt, and the second branch conveyer belt.

Other advantages and novel features of the present invention will become more apparent from the following detailed description of an embodiment when taken in conjunction with the accompanying drawings, in which:

DETAILED DESCRIPTION

Figure 1:
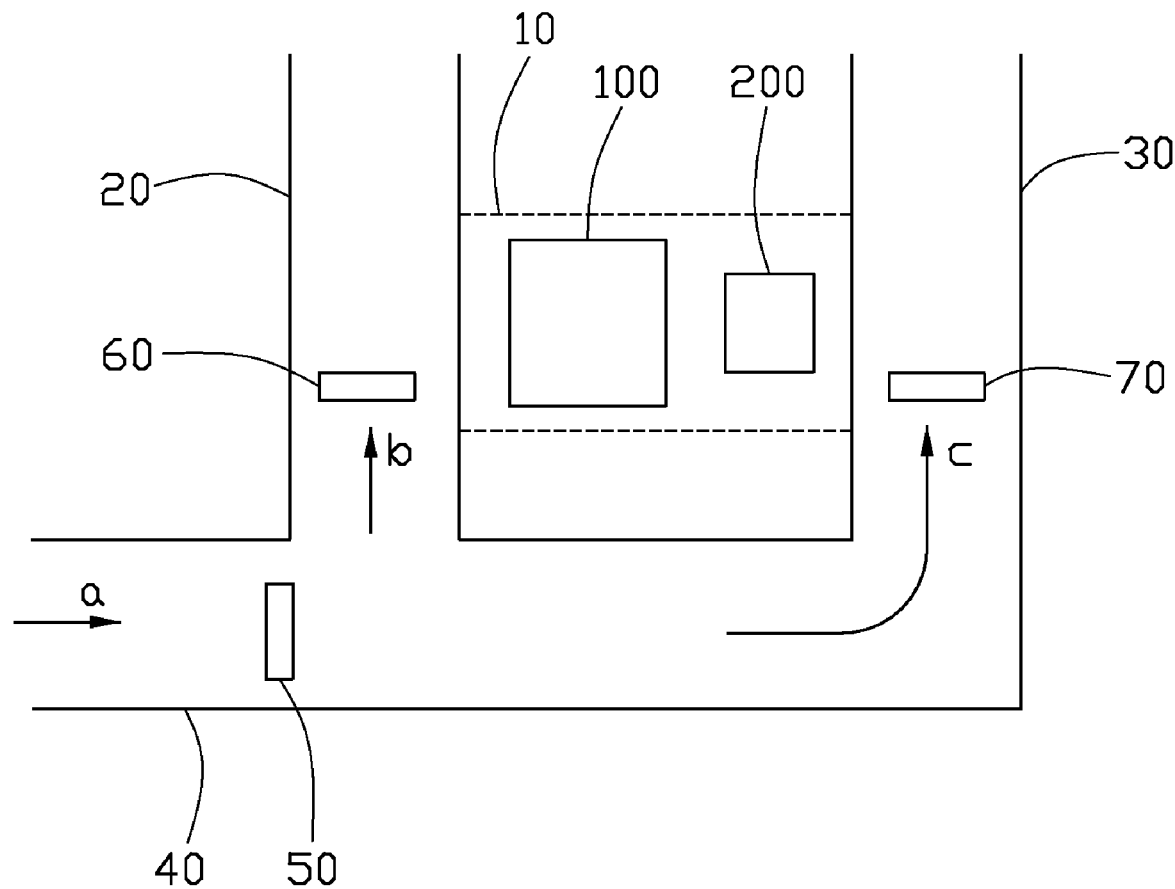
FIG. 1 is a schematic view of a reworking system in accordance with an embodiment of the present invention.

Referring to FIG. 1, a reworking system in accordance with an embodiment of the present invention is configured for reworking two types of electronic products, RoHS and Non-RoHS. The reworking system includes a reworking machine 100 configured to rework the two types of electronic products previously mentioned, a computer 200, a main conveyer belt 40, a first branch conveyer belt 20, a second branch conveyer belt 30, a primary scanner 50, a first secondary scanner 60, and a second secondary scanner 70.

The reworking machine 100 and the computer 200 are placed in a device position area 10. The first branch conveyer belt 20 and the second branch conveyer belt 30 are respectively placed on two sides of the device position area 10 in parallel. The first branch conveyer belt 20 and the second branch conveyer belt 30 are connected to the main conveyer belt 40 perpendicularly and form an F-shaped product conveyer area. The primary scanner 50, the first secondary scanner 60, and the second secondary scanner 70 are respectively installed on the main conveyer belt 40, the first branch conveyer belt 20, and the second branch conveyer belt 30, and configured to scan bar codes of the electronic products. The computer 200 is configured to receive and process scanned data from the primary scanner 50, the first secondary scanner 60, and the second secondary scanner 70, and control driving devices of the main conveyer belt 40, the first branch conveyer belt 20, and the second branch conveyer belt 30 according to the data that's been processed and scanned.

Figure 2:
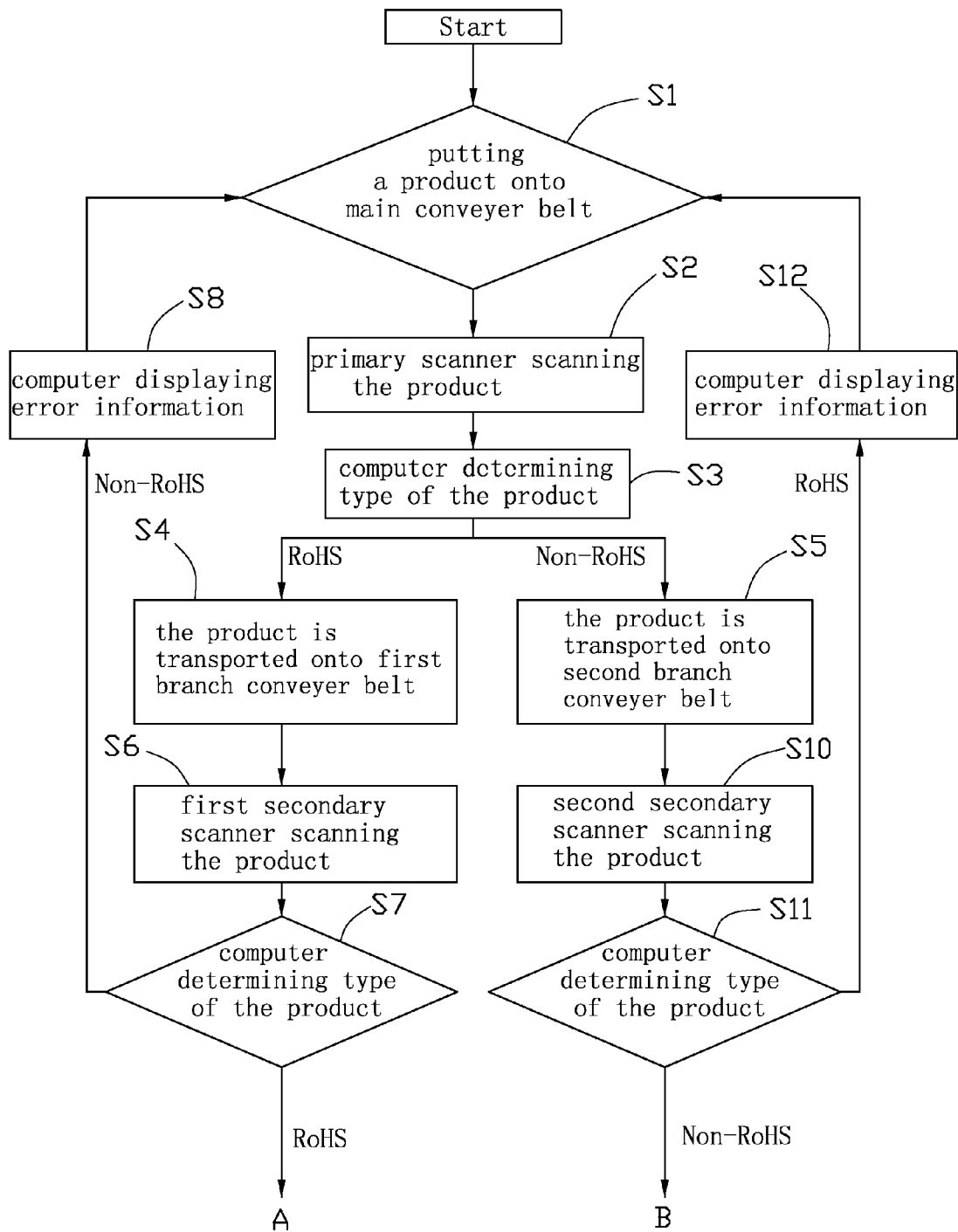
FIGS. 2 and 3 are flow charts of a control method of the reworking system of FIG. 1.
Figure 3:
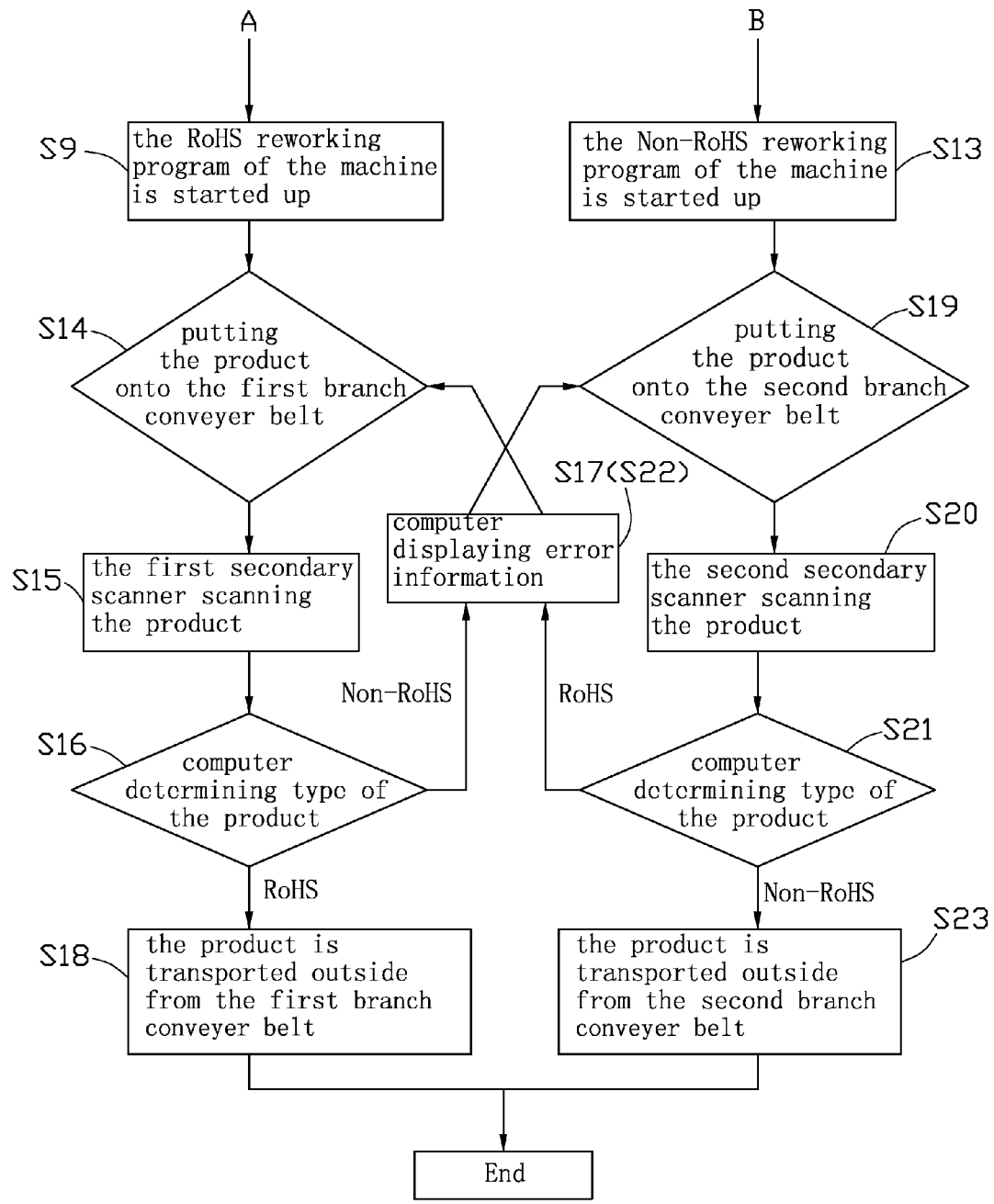

Referring also to FIGS. 2 and 3, a control method of the reworking system in accordance with an embodiment of the present invention includes the following steps:

S1: putting a product to be reworked onto the main conveyer belt 40, the computer controls the driving device of the main conveyer belt 40 to transport the product along the arrowhead direction 'a' of FIG. 1;

S2: when the product to be reworked is transported under the primary scanner 50, the primary scanner 50 scans the bar codes of the product and transmits the data received to the computer 200;

S3: the computer 200 determines whether the product to be reworked is of type RoHS or Non-RoHS based on the scanned data from the primary scanner 50;

S4: if the type of the product to be reworked is RoHS, the computer 200 controls the driving device of the first branch conveyer belt 20, thereby transporting the product onto the first branch conveyer belt 20;

S5: if the type of the product to be reworked is Non-RoHS, the computer 200 controls the driving device of the second branch conveyer belt 30, thereby transporting the product onto the second branch conveyer belt 30;

S6: after step S4 has been completed, and when the product to be reworked has been transported under the first secondary scanner 60, the first secondary scanner 60 scans the bar codes of the product and transmits the data received to the computer 200;

S7: the computer 200 determines whether the product to be reworked is of type RoHS or Non-RoHS based on the scanned data from the first secondary scanner 60;

S8: if the type of the product to be reworked is Non-RoHS, the computer 200 displays error information, an operator returns the product to the main conveyer belt 40, and step S1 is executed;

S9: if the type of the product to be reworked is RoHS, the computer 200 controls the reworking machine 100 to start up a RoHS reworking program, thereby allowing the operator to rework the product via the reworking machine 100; in this embodiment, steps S6, S7, and S8 are configured to determine whether the type of the product to be reworked is RoHS or Non-RoHS a second time, the steps S6, S7, and S8 can be deleted based on user-specific needs, and the first secondary scanner 60 can be deleted to reduce costs associated with the reworking process;

S10: after step S5 has been completed, and when the product to be reworked has been transported under the second secondary scanner 70, the second secondary scanner 70 scans the bar codes of the product and transmits the data received to the computer 200;

S11: the computer 200 determines whether the product is of type RoHS or Non-RoHS based on the scanned data from the second secondary scanner 70;

S12: if the type of the product to be reworked is RoHS, the computer 200 displays error information, and an operator returns the reworking product on the main conveyer belt 40 to execute the step S1;

S13: if the type of the product to be reworked is Non-RoHS, the computer 200 controls the reworking machine 100 to start up a Non-RoHS reworking program, thereby allowing the operator to rework the product via the reworking machine 100; in this embodiment, steps S10, S11, and S12 are configured to determine whether the type of the product to be reworked is RoHS or Non-RoHS a second time, the steps S10, S11, and S12 can be deleted based on user-specific needs, and the second secondary scanner 70 can be deleted to reduce costs associated with the reworking process;

S14: after step S9 has been completed, the product to be reworked is returned to the first branch conveyer belt 20 by the operator, the computer 200 controls the driving device of the first branch conveyer belt 20 to transport the product along the arrowhead direction 'b' of FIG. 1; in other embodiments, step S14 and the following series of steps can be deleted in order to simplify the control method of the reworking system;

S15: when the product to be reworked has been transported under the first secondary scanner 60, the first secondary scanner 60 scans the bar codes of the product and transmits the data received to the computer 200;

S16: the computer 200 determines whether the product to be reworked is of type RoHS or Non-RoHS based on the scanned data from the first secondary scanner 60;

S17: if the type of the product to be reworked is Non-RoHS, the computer 200 displays error information and an operator places the product onto the second branch conveyer belt 30 and executes step S19;

S18: if the type of the product to be reworked is RoHS, the computer 200 controls the driving device of the first branch conveyer belt 20 to transport the product outside, thereby marking the completion of the reworking process; in this embodiment, steps S15, S16, and S17 are configured to determine whether the product to be reworked is of type RoHS or Non-RoHS a third time, steps S15, S16, and S17 can be deleted based on user-specific needs, and the first secondary scanner 60 can be deleted to reduce costs associated with the reworking process;

S19: after step S13 has been completed, the product to be reworked is returned onto the second branch conveyer belt 30 by the operator and the computer 200 controls the driving device of the second branch conveyer belt 30 to transport the reworking product along the arrowhead direction 'c' of FIG. 1; in other embodiments, step S19 and the following steps can be deleted for the purpose of simplifying the control method of the reworking system;

S20: when the product to be reworked is transported under the second secondary scanner 70, the second secondary scanner 70 scans the bar codes of the product and transmits the data received to the computer 200;

S21: the computer 200 determines whether the product to be reworked is of type RoHS or Non-RoHS based on the scanned data from the second secondary scanner 70;

S22: if the type of the product to be reworked is RoHS, the computer 200 displays error information and an operator places the product onto the first branch conveyer belt 20 to execute step S14;

S23: if the type of the product to be reworked is Non-RoHS, the computer 200 controls the driving device of the second branch conveyer belt 30 to transport the product outside, thereby marking the completion of the reworking process; in this embodiment, steps S20, S21, and S22 are configured to determine whether the product to be reworked is of type RoHS or Non-RoHS a third time, steps S20, S21, and S22 can be deleted based on user-specific needs, and the second secondary scanner 60 can be deleted to reduce costs associated with the reworking process.

The control method of the reworking system can easily rework the two types of electronic devices previously mentioned, thereby reducing reworking costs and increasing efficiency with regards to the reworking machine.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A reworking system control method comprising:
   providing a reworking system comprising:
      a reworking machine configured for reworking products that belong to a first type and a second type;
      a main conveyer belt configured for transporting the products to be reworked;
      a first branch conveyer belt connected to the main conveyer belt, configured for conveying the first type of the products to be reworked;
      a second branch conveyer belt connected to the main conveyer belt, configured for transporting the second type of the products to be reworked;
      a primary scanner installed on the main conveyer belt and configured to scan bar codes of the products to be reworked;
   a computer configured to receive and process scanned data from the primary scanner, and actuate the main conveyer belt, the first branch conveyer belt, and the second branch conveyer belt according to processed scanned data;
      a first secondary scanner installed on the first branch conveyer belt and configured to scan bar codes of the products to be reworked, the computer configured to receive and process scanned data from the first secondary scanner and actuate the main conveyer belt and the first branch conveyer belt according to processed scanned data; and
      a second secondary scanner installed on the second branch conveyer belt and configured to scan bar codes of the products to be reworked, the computer configured to receive and process scanned data from the second secondary scanner and actuate the main conveyer belt and the second branch conveyer belt according to processed scanned data;
   putting one product to be reworked onto the main conveyer belt, the computer actuating the main conveyer belt to transport the product;
   when the product to be reworked is transported under the primary scanner, the primary scanner scans the bar codes of the product and transmits the data of the bar codes to the computer;
   the computer determines the type of the product to be reworked according to the scanned data from the primary scanner;
   upon a condition that the type of the product to be reworked is the first type, the computer actuates the first branch conveyer belt, thereby the product is transported onto the first branch conveyer belt;
      when the product to be reworked is transported under the first secondary scanner, the first secondary scanner scans the bar codes of the product and transmits the data of the bar codes to the computer;

the computer determines the type of the product to be reworked according to the scanned data from the first secondary scanner;

upon a condition that the type of the product to be reworked is the second type, the computer displays error information;

upon a condition that the type of the product to be reworked is the first type, the computer controls the reworking machine to startup a first reworking program, thereby the product is reworked by the reworking machine;

upon a condition that the type of the product to be reworked is the second type, the computer actuates the second branch conveyer belt, thereby the product is conveyed onto the second branch conveyer belt;

when the product to be reworked is transported under the second secondary scanner, the second secondary scanner scans the bar codes of the product and transmits the data of the bar codes to the computer;

the computer determines the type of the product to be reworked according to the scanned data from the second secondary scanner;

upon a condition that the type of the product to be reworked is the first type, the computer displays error information; and upon a condition that the type of the product to be reworked is the second type, the computer controlling the reworking machine to startup a second reworking program, thereby the product is reworked by the reworking machine.

2. The control method as claimed in claim 1, further comprising:

after reworking the product to be reworked, putting the product onto the first branch conveyer belt in response to the product to be reworked being determined as the first type;

when the product to be reworked is transported under the first secondary scanner, the first secondary scanner scans the bar codes of the product and transmits the data of the bar codes to the computer;

the computer determines the type of the product to be reworked according to the scanned data from the first secondary scanner;

upon a condition that the type of the product to be reworked is the second type, the computer displays error information, and the product is put onto the second branch conveyer belt; and the computer actuating the second branch conveyer belt to transport the product to be reworked outside, thereby completing the reworking job.

3. The control method as claimed in claim 1, further comprising:

after reworking the product to be reworked, putting the product onto the second branch conveyer belt in response to the product to be reworked being determined as the second type;

when the product to be reworked is transported under the second secondary scanner, the second secondary scanner scans the bar codes of the product and transmits the data of the bar codes to the computer;

the computer determines the type of the product to be reworked according to the scanned data from the second secondary scanner;

upon a condition that the type of the product to be reworked is the first type, the computer displays error information, and the product is put onto the first branch conveyer belt; and the computer actuating the first branch conveyer belt to transport the product to be reworked outside, thereby completing the reworking job.

* * * * *